US012409379B2

(12) United States Patent
Sakai

(10) Patent No.: US 12,409,379 B2
(45) Date of Patent: Sep. 9, 2025

(54) FUSIBLE TOY BEAD

(71) Applicant: EPOCH COMPANY, LTD., Tokyo (JP)

(72) Inventor: Ryo Sakai, Tokyo (JP)

(73) Assignee: EPOCH COMPANY, LTD., Tokyo (JP)

( * ) Notice: Subject to any disclaimer, the term of this patent is extended or adjusted under 35 U.S.C. 154(b) by 0 days.

(21) Appl. No.: 18/122,214

(22) Filed: Mar. 16, 2023

(65) Prior Publication Data

US 2023/0218982 A1 Jul. 13, 2023

Related U.S. Application Data

(63) Continuation of application No. 16/696,326, filed on Nov. 26, 2019, now Pat. No. 11,648,459, which is a continuation of application No. 16/226,701, filed on Dec. 20, 2018, now Pat. No. 10,758,813.

(30) Foreign Application Priority Data

Dec. 27, 2017 (JP) ................................ 2017-250580

(51) Int. Cl.
*A63F 9/06* (2006.01)
*A63F 3/00* (2006.01)
*A63H 33/06* (2006.01)
*B44B 9/00* (2006.01)
*B44C 3/12* (2006.01)

(52) U.S. Cl.
CPC ............... *A63F 9/06* (2013.01); *A63H 33/06* (2013.01); *B44B 9/00* (2013.01); *B44C 3/12* (2013.01); *A63F 2003/00794* (2013.01); *A63F 2250/0428* (2013.01)

(58) Field of Classification Search
CPC ..... A63F 9/06; A63F 2003/00794; B44C 3/12
See application file for complete search history.

(56) References Cited

U.S. PATENT DOCUMENTS

| | | | | |
|---|---|---|---|---|
| 3,894,352 | A | 7/1975 | Hooker | |
| 4,227,334 | A | 10/1980 | Hooker | |
| 5,447,584 | A | 9/1995 | Shakespeare et al. | |
| 5,482,491 | A | 1/1996 | Kichijyo | |
| 5,722,657 | A | 3/1998 | Cabrera | |
| 5,871,384 | A | 2/1999 | Kichijo | |
| 6,244,597 | B1 | 6/2001 | Matijek | |
| 9,956,495 | B2 | 5/2018 | Kamiyama et al. | |
| 2005/0014112 | A1 * | 1/2005 | Fentress ................ | G09B 23/02 434/211 |
| 2009/0298382 | A1 | 12/2009 | Ochi | |

(Continued)

FOREIGN PATENT DOCUMENTS

| | | | |
|---|---|---|---|
| AU | 2012202449 B2 | 2/2014 | |
| CN | 1147969 A | 4/1997 | |

(Continued)

OTHER PUBLICATIONS http://www.mamasmiles.com/beados-review/ (Year: 2014).*

(Continued)

*Primary Examiner* — Jeffrey S Vanderveen
(74) *Attorney, Agent, or Firm* — Faegre Drinker Biddle & Reath LLP

(57) ABSTRACT

A fusible toy bead includes a plurality of protrusions and a plurality of recesses.

19 Claims, 8 Drawing Sheets

(56) References Cited

U.S. PATENT DOCUMENTS

| | | | |
|---|---|---|---|
| 2010/0311299 A1 | 12/2010 | Rath | |
| 2013/0183881 A1 | 7/2013 | Kamiyama | |
| 2017/0246551 A1 | 8/2017 | Kamiyama et al. | |

FOREIGN PATENT DOCUMENTS

| | | | | |
|---|---|---|---|---|
| CN | 1209076 A | | 2/1999 | |
| CN | 2373088 Y | | 4/2000 | |
| CN | 2728581 Y | | 9/2005 | |
| CN | 200950877 Y | | 9/2007 | |
| CN | 101068607 A | | 11/2007 | |
| CN | 102772892 A | | 11/2012 | |
| CN | 206950678 U | | 2/2018 | |
| CN | 207805060 U | | 9/2018 | |
| EP | 0069188 A1 | | 1/1983 | |
| GB | 2531575 A | | 4/2016 | |
| GB | 2547795 A | | 8/2017 | |
| JP | 2005-166308 A | | 6/2005 | |
| JP | 2006-286590 A | | 10/2006 | |
| JP | 3131292 U | | 4/2007 | |
| JP | 2012-232002 A | | 11/2012 | |
| JP | 2013-143986 A | | 7/2013 | |
| JP | 3210316 U | | 5/2017 | |
| JP | 2017-153567 A | | 9/2017 | |
| SU | 1127609 A1 | | 12/1984 | |
| SU | 1151254 A1 | | 4/1985 | |
| WO | WO-2016191823 A1 | * | 12/2016 | ............. A63H 33/04 |

OTHER PUBLICATIONS

Office Action issued May 28, 2019 in GB Application No. 1820894.2.

Australian Office Action dated Sep. 12, 2019 that issued in Australian patent application No. 2018282477 attached.

A Chinese Office Action, along with its English-language translation, dated Sep. 9, 2019 that issued in CN Patent Application No. 201822212883.9.

CN Office Action issued Jun. 24, 2020 in Chinese Application No. 201811602484.1 (with attached English-language translation).

JP Office Action dated Jan. 23, 2020 from corresponding Japanese patent application No. 2017-250580 (with attached English-language translation).

Carnelian such as plain sugar, [Online], Jul. 30, 2016, URL, https://web.archive.org/web/20160730003054/http://esperanza-parts.com/?pid=102454818.

Root of Small Colored Sugar Candy, [Online], Mar. 17, 2012 , URL, asutekina-beads.sblo.jp/article/56647957.html.

A list of goods in the form of a star, [Online], Nov. 8, 2016, URL, https://web.archive.org/web/20161108003907/http://www.stone-castle.com/shopbrand/np00212/.

RU Office Action dated Nov. 29, 2019 from corresponding Russian patent application No. 2018146681 (with attached English-language translation).

Internet source http://biplant.ru/konstruktory/seriy%D0%B0samocvetiki/samocvetiki-podarochnoe-izdanie, date of publication Sep. 19, 2016 (with attached English-language translation).

KR Office Action dated Dec. 24, 2019 from corresponding Korean patent application No. 10-2018-0167095 (with attached English-language translation).

GB Office Action dated Jan. 12, 2021 in Application No. GB2012663.7.

GB Office Action dated Jan. 12, 2021 in Application No. GB1917168.5.

Kraftika, Nov. 14, 2017: “Clear yellow star beads . . . ”. Available from:https://kraftika.shop/en/clear-yellow-star-beads-glass-star-bead-flat-star-glass-beads-yellow-star-czech-glass-beads-yellow-glass-czech-star-bead-8mm-30pc/ [Accessed Jan. 6, 2021].

AmyMade, Jan. 30, 2014, “Ghibli Collab: Soot Sprite Resin Charm Tutorial” Available from: http://www.youtube.com/watch?v=t81ZtZCQ-is [Accessed Jan. 6, 2021].

Creative Rachy, Dec. 31, 2014, “How to Shape Stars (No Mold!)” Available from: https://www.youtube.com/watch?v=TWz8HdTc424 [Accessed Jan. 6, 2021].

Epoch v Character Options [2017] EWHC 556 (IPEC).

CN Office Action issued Mar. 11, 2021 in Chinese Application No. 201811602484.1 (with attached English-language translation).

JP Office Action dated Nov. 19, 2020 from corresponding Japanese Patent Application No. 2020-034790 (with attached English-language translation).

The First Aqua Beads and Lazy Wendy’s Easy Chef Life [online]—Aug. 13, 2016 [Nov. 5, 2020 search] <URL: https://ameblo.jp/wendyandmelody/entry-12190108000.html>.

AU Office Action issued Dec. 8, 2020 in Australian Application No. 2019271887.

3D Molecular Designs—“NaCI Lattice—Magnetic Sodium Chloride Ions” <URL:https://web.archive.org/web/20170527100337/https://www.3dmoleculardesigns.com/Education-Products/NaCl-Lattice.htm>, Published on May 27, 2017 as per Internet Archive.

3D Molecular Designs—“Water Kit—Magnetic Water Molecules” <URL:https://web.archive.org/web/20160807023823/https://www.3dmoleculardesigns.com/Education-Products/Water-Kit.htm>, Published on Aug. 7, 2017 as per Internet Archive.

First Chinese Office Action issued Aug. 1, 2025, in Application No. 202310935384.5.

* cited by examiner

FUSIBLE TOY BEAD

CROSS-REFERENCE TO RELATED APPLICATIONS

This application is a continuation application of U.S. patent application Ser. No. 16/696,326, filed Nov. 26, 2019, which is based on and claims priority from Japanese Patent Application No. 2017-250580 filed on Dec. 27, 2017, the entire contents of which are incorporated herein by reference.

FIELD

One or more embodiments of the present invention relate to a fusible toy bead made of a water-soluble resin.

BACKGROUND

Fusible toy beads made of a water-soluble resin are known. For example, JP-U-3131292 discloses a toy bead set which employs spherical fusible beads made of a water-soluble resin. JP-A-2013-143986 discloses a transparent polyhedral fusible toy bead made of a water-soluble resin.

For example, a user can play using such fusible toy beads in the following manner. First, spherical or polyhedral fusible toy beads are selected according to a desired pattern and put on a holding tray which is formed with recesses. In this state, the fusible toy beads are in contact with each other. Then water is sprayed over the fusible toy beads using a sprayer or the like, whereby the fusible toy beads are moistened. As a result, the fusible toy beads melt and fusible toy beads that are in contact with each other are connected together. If they are dried as they are, they harden while they are kept connected together. Alternatively, it is possible to harden fusible toy beads that are layered. In this manner, the user can play pleasantly by making an assembly of fusible toy beads while selecting spherical ones and polyhedral ones according to a desired pattern or shape.

SUMMARY

For example, an assembly of fusible toy beads is produced using plural fusible toy beads only. For another example, one sometimes plays in such a manner as to form holes or the like in an assembly of fusible toy beads and insert, into the holes or the like, other things as decorative members (e.g., jewel-like toys or marbles). A produced assembly of fusible toy beads may be attached to a bag, clothes, or the like as an ornament. For the purpose of attaching other things to an assembly of fusible toy beads by inserting the former into the latter or bring an assembly of fusible toy beads outdoors as an ornament, there may occur a case that the bonding strength of fusible toy beads is insufficient.

An object of one or more embodiments of the present invention is to provide a fusible toy bead capable of increasing the bonding strength of fusible toy beads.

A fusible toy bead according to one or more embodiments of the present invention includes a plurality of protrusions and a plurality of recesses.

According to one or more embodiments of the present invention, it is possible to provide a fusible toy bead capable of increasing the bonding strength of fusible toy beads.

DETAILED DESCRIPTION

Figure 1:
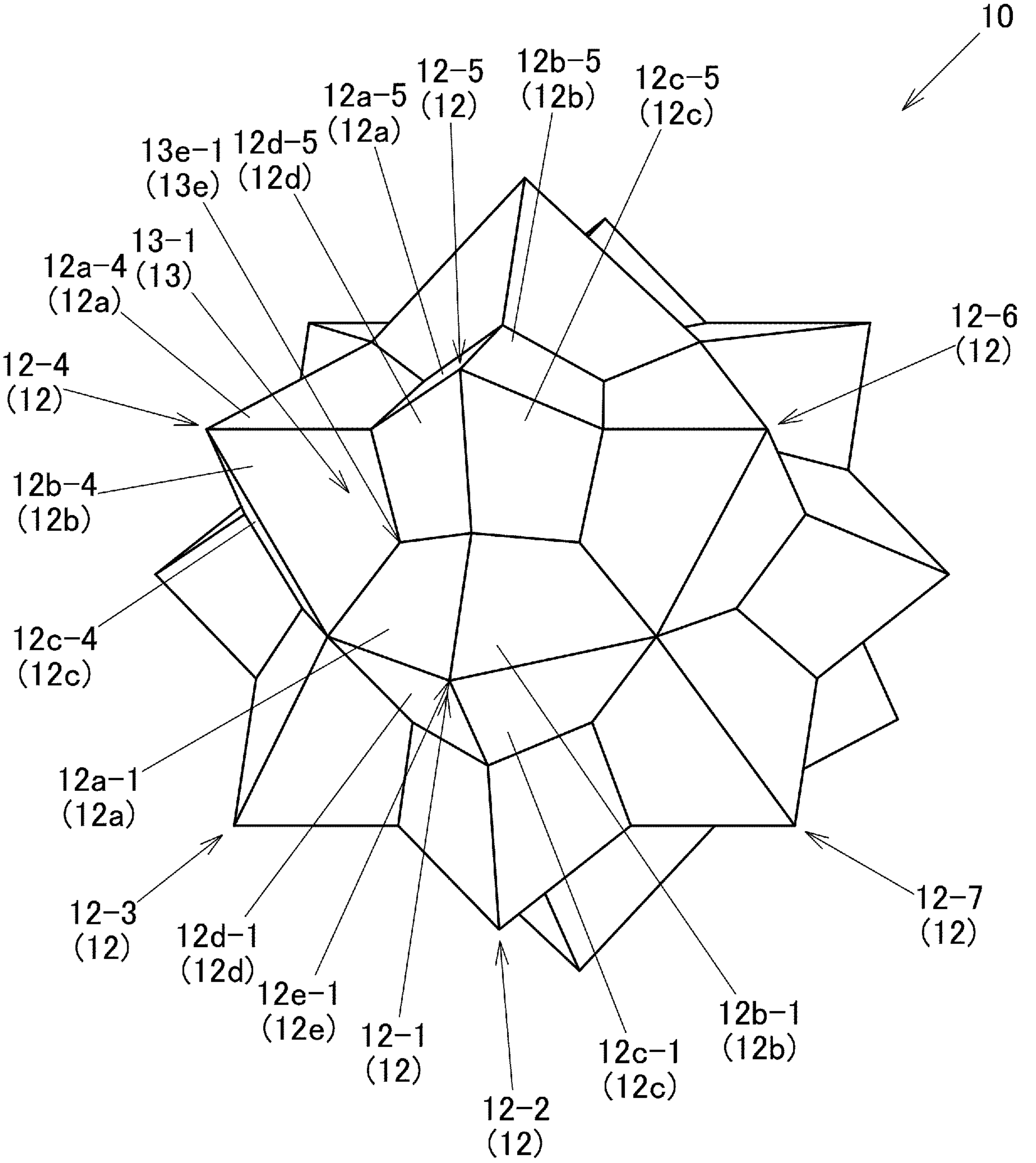
FIG. 1 is a perspective view of a fusible toy bead according to an embodiment of the invention.

One or more embodiments of the present invention will be hereinafter described with reference to the drawings. As shown in FIG. 1, a fusible toy bead 10 is formed with plural protrusions 12 and recesses 13.

Each protrusion 12 has plural (i.e., four) quadrilateral flat surfaces 12*a*-12*d*. The flat surfaces 12*a*-12*d* form a peak 12*e* by being combined together in such a manner that adjoining ones of them share one side. For example, a flat surface 12*a*-1 shares one side with each of adjoining flat surfaces 12*b*-1 and 12*d*-1.

Plural protrusions that are adjacent to each protrusion 12 are arranged radially. For example, six protrusions 12-2 to 12-7 that are adjacent to a protrusion 12-1 are arranged radially. Any of the flat surfaces 12*a*-12*d* of each protrusion 12 is continuous with any of the flat surfaces 12*a*-12*d* of the adjacent protrusion 12. In this manner, the fusible toy bead 10 according to the embodiment has 18 protrusions 12 and hence has 72 flat surfaces (flat surfaces 12*a*-12*d*).

Each recess 13 is formed by connecting three flat surfaces (three of flat surfaces 12*a*-12*d*), opposed to each other, of three adjacent protrusions 12. For example, a recess 13-1 is formed by connecting three flat surfaces 12*a*-1, 12*b*-4, and 12*d*-5, opposed to each other, of the three adjacent protrusions 12-1, 12-4, and 12-5. More specifically, the three flat surfaces 12*a*-1, 12*b*-4, and 12*d*-5 which are opposed to each other are connected to each other so as to share, in forming the recess 13-1, sides of the three flat surfaces 12*a*-1, 12*b*-4, and 12*d*-5, not shared with any of flat surfaces 12*b*-1, 12*d*-1, 12*a*-4, 12*c*-4, 12*a*-5, and 12*c*-5, adjoining the three flat surfaces 12*a*-1, 12*b*-4, and 12*d*-5 and contributing to the formation of the protrusions 12-1, 12-4, and 12-5, are connected to each other. Each recess 13 has one recess bottom 13*e* (13*e*-1). The thus-formed fusible toy bead 10 assumes a star shape when projected from at least one direction.

The fusible toy bead 10 is made of a water-soluble resin, more specifically, one obtained by kneading a resin containing polyvinyl alcohol. The resin to be used for forming the fusible toy bead 10 can be formed by selecting a transparent material, a light-transmitting material, or an opaque material as appropriate. Where the fusible toy bead 10 is formed using a transparent or translucent material, light incident on the fusible toy bead 10 is reflected repeatedly by protrusions 12 and recesses 13 or light that has transmitted through it is reflected repeatedly by protrusions 12 and recesses 13. In the fusible toy bead 10 which is a 72-hedron, the distances between the flat surfaces 12*a*-12*d* of one protrusion 12 and those of another protrusion 12 are short. As a result, diffuse reflection of light occurs at the surfaces of the fusible toy bead 10 so as to produce high-luminance light beams, whereby the fusible toy bead 10 looks brilliant. Furthermore, as mentioned above the fusible toy bead 10 may have a star-shaped projection, in which case it looks more beautiful.

Figure 2:
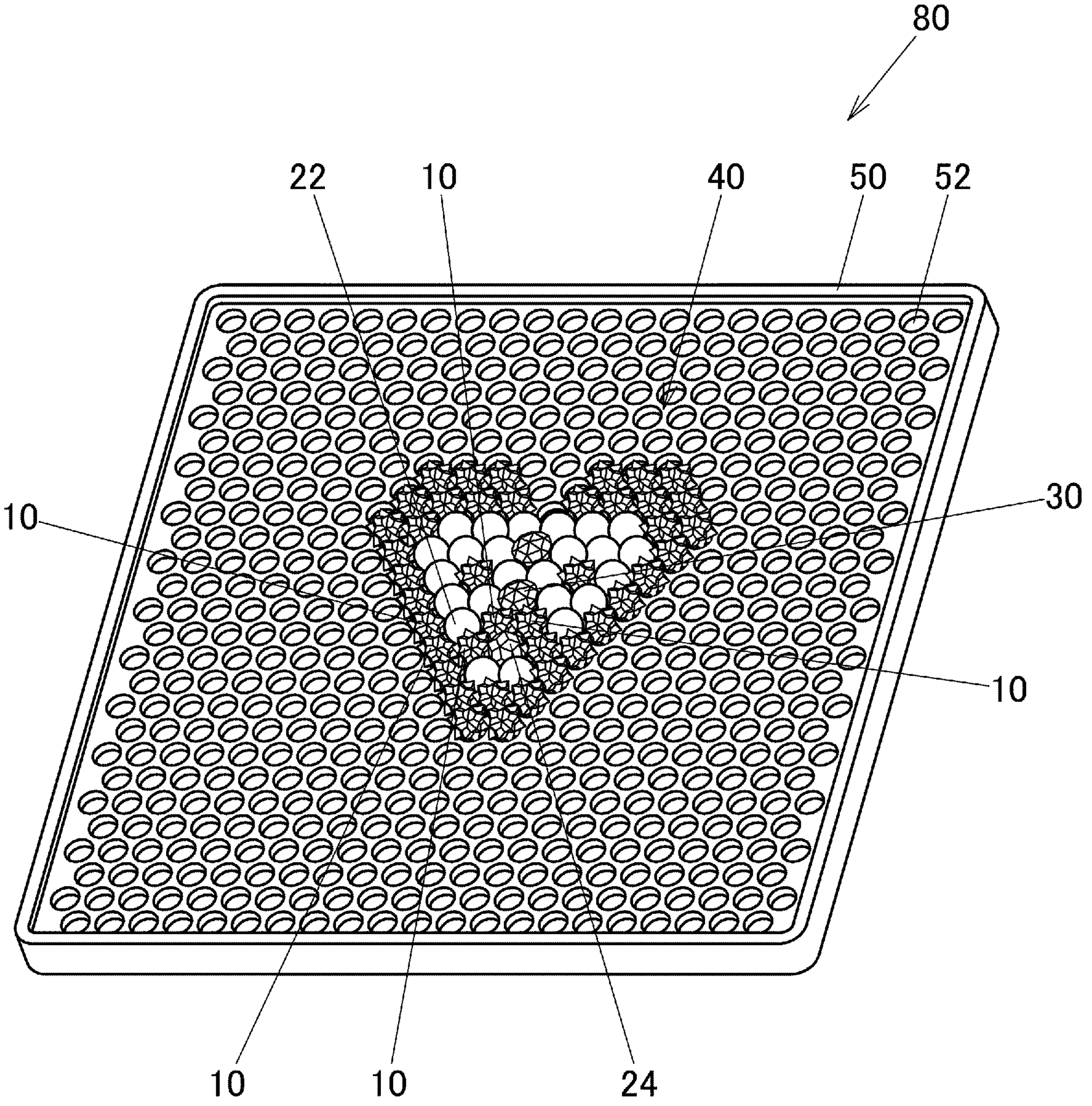
FIG. 2 is a perspective view showing an example use of a toy bead set that employs fusible toy beads according to the embodiment.

FIG. 2 shows an example use of a toy bead set 80. The toy bead set 80 is equipped with plural fusible toy beads 10 having the protrusions 12 and the recesses 13, plural spherical fusible toy beads 22, plural polyhedral fusible toy beads 24 (rhombic triacontahedron), plural resin-plated decorative toy beads 30, and a holding tray 50.

Like each fusible toy bead 10, each fusible toy bead 22 and each fusible toy bead 24 are formed by kneading a resin containing polyvinyl alcohol and molding a resulting mixture into a transparent or opaque, colored or colorless sphere or polyhedron.

Each decorative toy bead 30 is made of a water-soluble resin and plated with resin. Thus, the surface of each decorative toy bead 30 is colored in gold, silver, or the like and exhibits high reflectivity. Each decorative toy bead 30 is held by arranging fusible toy beads 10, 22, and 24 around it and melting and then hardening them.

The holding tray 50 is shaped like a rectangular plate and its surface is formed with plural circular recesses 52. The recesses 52 are offset every row (or column). As a result, fusible toy beads 10, 22, and 24 can be placed radially around each fusible toy bead 10, 22, or 24 or decorative toy bead 30 that is set in a recess 52. The diameter of each recess 52 is set smaller than the diameters of the fusible toy beads 10, 22, and 24 etc. and the distance between the centers of adjacent recesses 52 is set so that two fusible toy beads 10 and 22, 22 and 24, or 24 and 10 that are put in adjacent recesses 52 are in contact with each other or spaced from each other by only a very short distance.

A user can play using the toy bead set 80 in the following manner. First, the user puts plural fusible toy beads 10, 22, and 24 and decorative toy beads 30 on the holding tray 50 so as to form a desired pattern. In the example of FIG. 2, a fusible toy bead assembly 40 is formed by arranging fusible toy beads 10, 22, and 24 and decorative toy beads 30 in a desired manner so as to form a heart shape as a whole.

Figure 3:
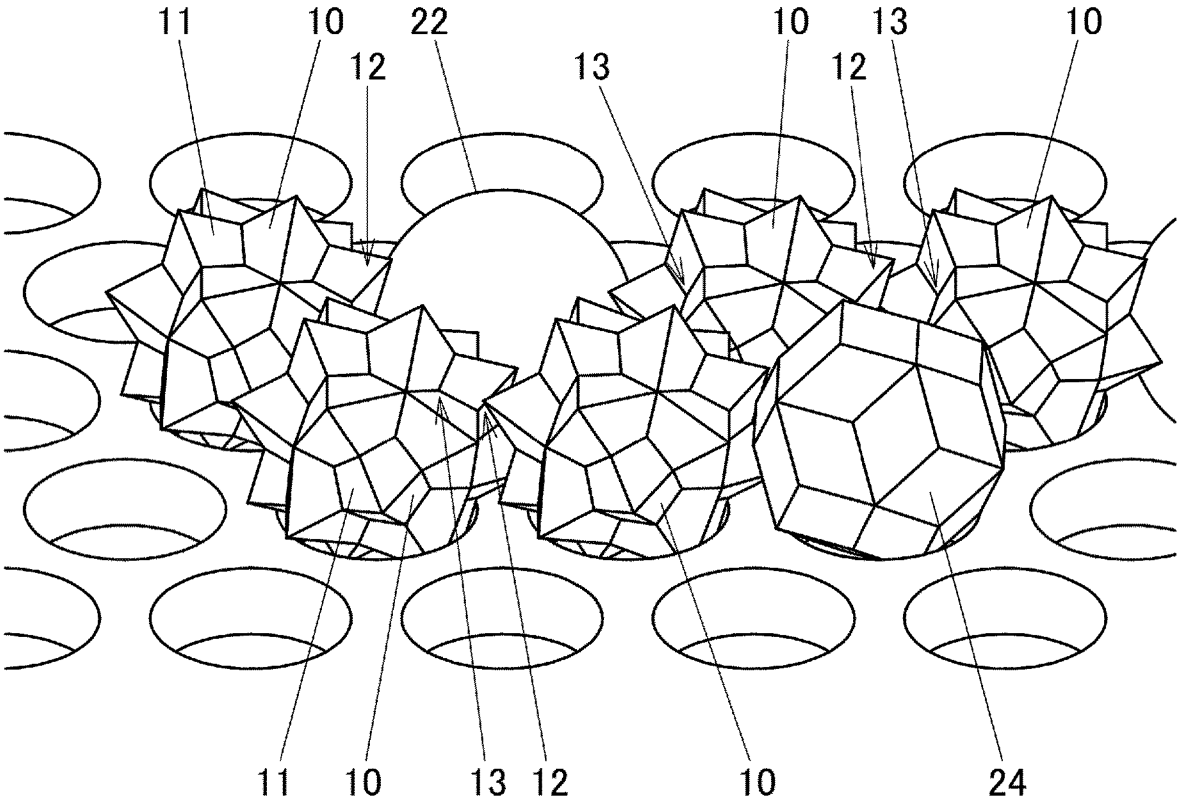
FIG. 3 is an enlarged perspective view of part of the fusible toy bead set shown in FIG. 2 which employs fusible toy beads according to the embodiment.

As shown in FIG. 3 which is an enlarged view of part of the fusible toy bead assembly 40 shown in FIG. 2, adjacent fusible toy beads 10 are engaged with each other in such a manner that plural ones of the flat surfaces 12*a*-12*d* (see FIG. 1) of a protrusion 12 of one fusible toy bead 10 are in contact with plural flat surfaces of a protrusion 12 of the other fusible toy bead 10. Each of the spherical fusible toy beads 22 and the polyhedral fusible toy beads 24 is also in contact with plural flat surfaces of each of the fusible toy beads 10 located around it.

When water is sprayed, with a sprayer or the like, over the fusible toy bead assembly 40 which is put on the holding tray 50, surface layers of the fusible toy beads 10, 22, and 24 melt and the fusible toy beads 10, 22, and 24 are connected to each other. Excess water drops to the recesses 52 of the holding tray 50 and is stored there. The fusible toy bead assembly 40 is thereafter dried as it is, whereby the fusible toy beads 10, 22, and 24 harden being kept connected to each other. At this time, each of the fusible toy beads 10, 22, and 24 that is in contact with plural ones of the flat surfaces 12*a*-12*d* of a protrusion 12 of a fusible toy bead 10 has a larger contact area than each of spherical fusible toy beads 22 that are in contact with each other or each of polyhedral fusible toy beads 24 that are in contact with each other. This increases the bonding strength that is obtained when the fusible toy bead assembly 40 is hardened.

Next, descriptions will be made of modifications that are different in shape from the fusible toy bead 10 according to the embodiment of the invention.

(Modification 1)

Figure 4:
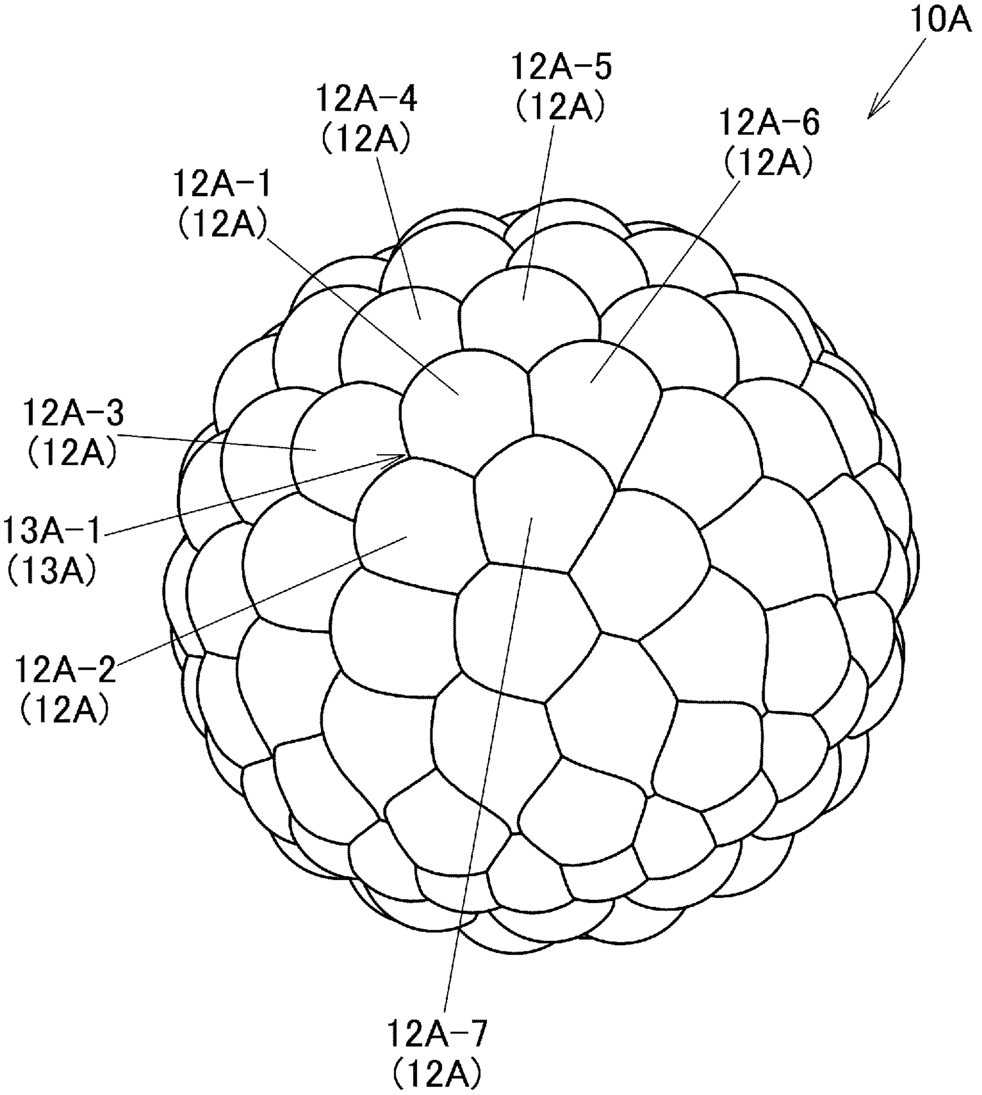
FIG. 4 is a perspective view of a fusible toy bead according to a first modification of the embodiment.

A fusible toy bead 10A shown in FIG. 4 has plural protrusions 12A and plural recesses 13A. The protrusions 12A are approximately semispherical. Plural protrusions 12A adjacent to each protrusion 12A are arranged radially in such a manner that their surfaces are connected to each other. More specifically, for example, six protrusions 12A-2 to 12A-7 are arranged radially around a protrusion 12A-1. A recess 13A (e.g., recess 13A-1) is formed at the center of three protrusions 12A opposed to each other (e.g., protrusions 12A-1 to 12A-3).

(Modification 2)

Figure 5:
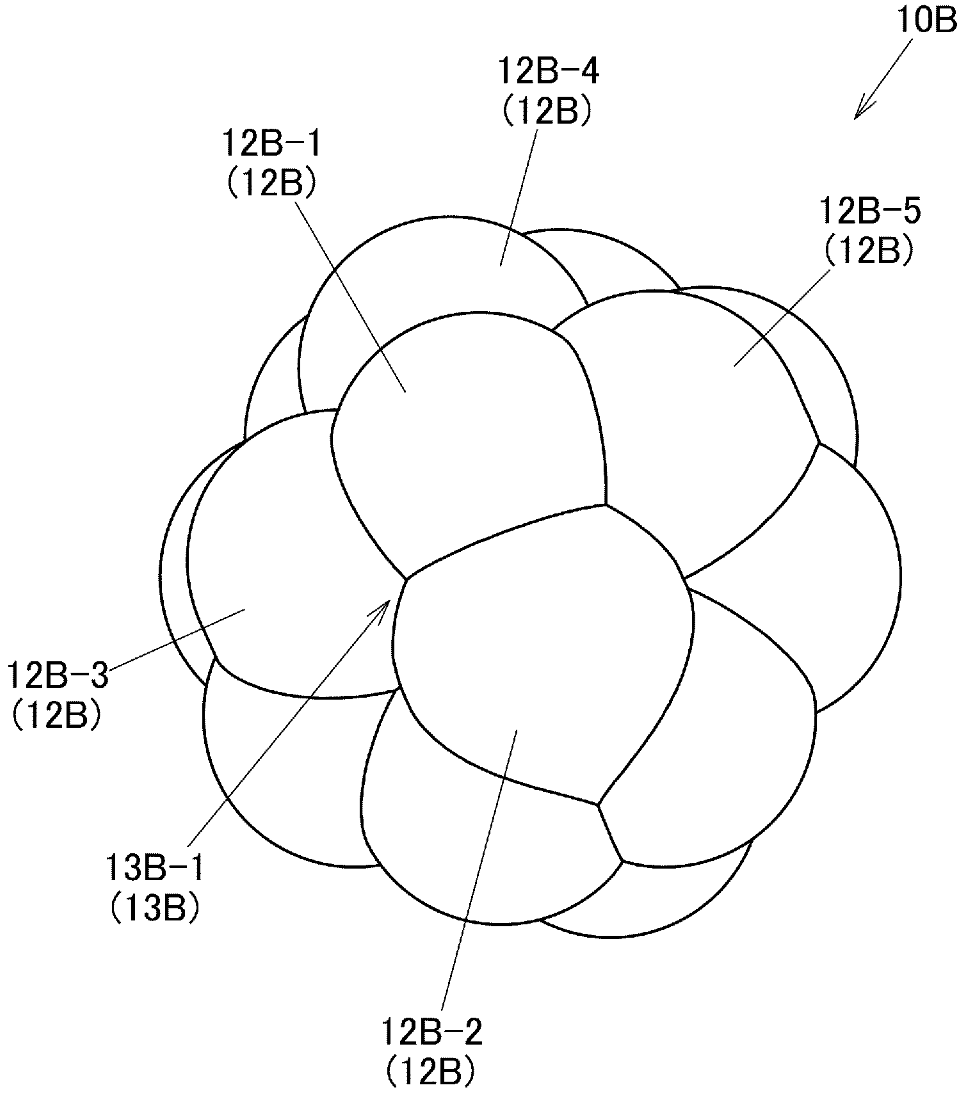
FIG. 5 is a perspective view of a fusible toy bead according to a second modification of the embodiment.

A fusible toy bead 10B shown in FIG. 5 has plural protrusions 12B and plural recesses 13B. The protrusions 12B are approximately semispherical. Plural protrusions 12B adjoining each protrusion 12B are arranged radially in such a manner that their surfaces are connected to each other. More specifically, for example, four protrusions 12B-2 to 12B-5 are arranged radially around a protrusion 12B-1. A recess 13B (e.g., recess 13B-1) is formed at the center of three protrusions 12B opposed to each other (e.g., protrusions 12B-1 to 12B-3).

(Modification 3)

Figure 6A:
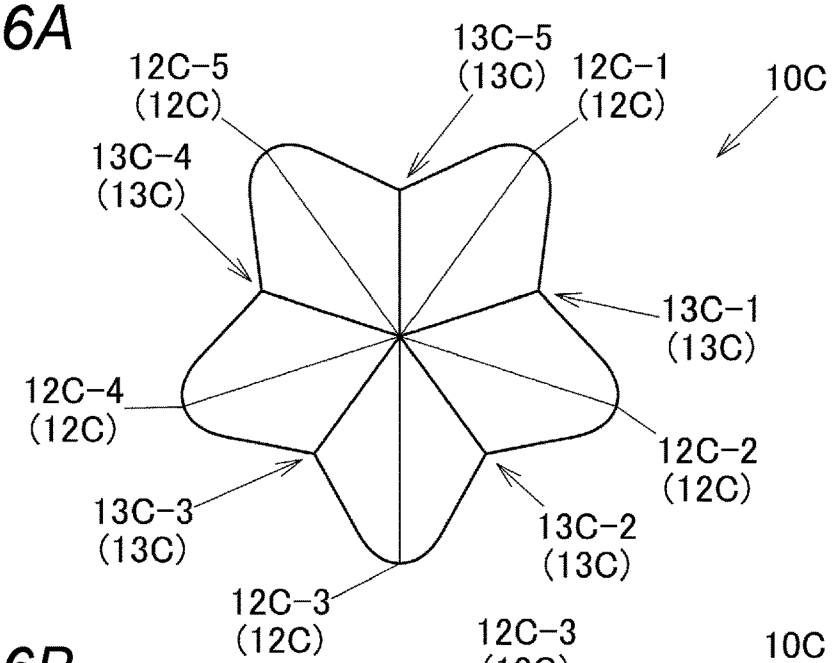
FIGS. 6A-6C are a plan view, a front view, and a perspective view, respectively, of a fusible toy bead according to a third modification of the embodiment.
Figure 6B:
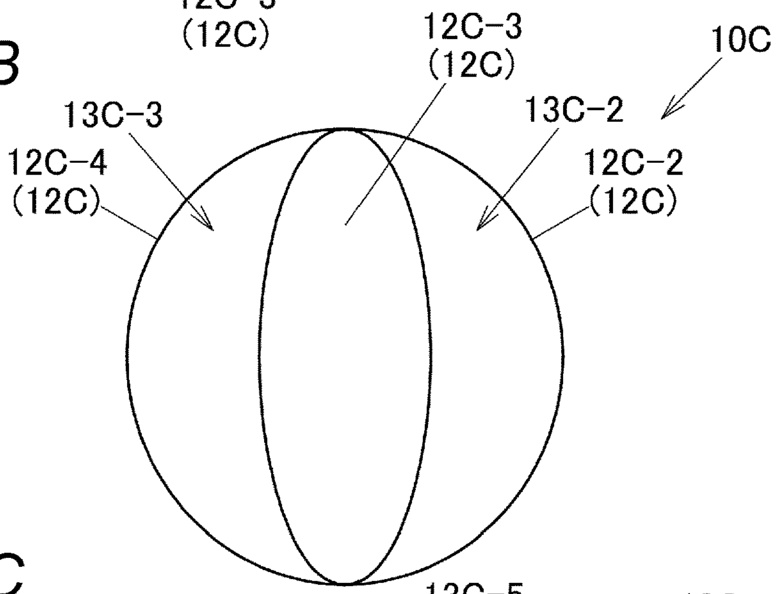
Figure 6C:
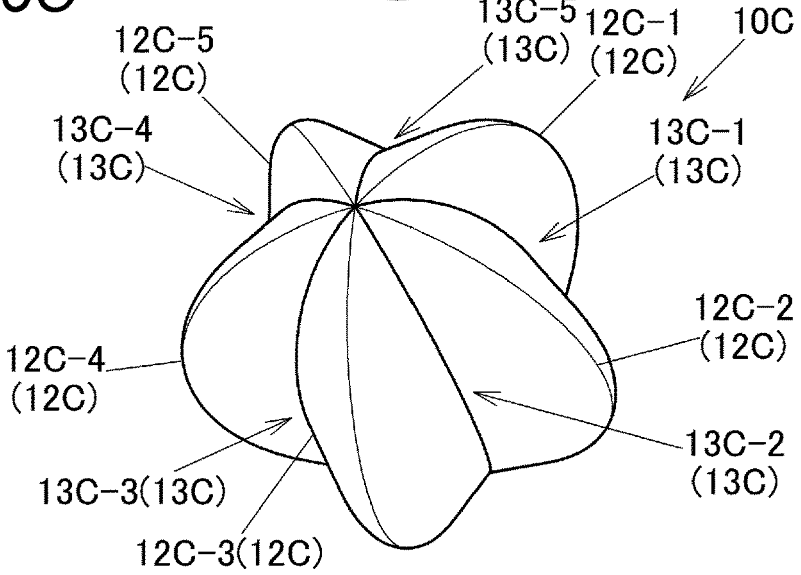

A fusible toy bead 10C shown in FIGS. 6A-6C has plural protrusions 12C and plural recesses 13C. As protrusions 12C-2 and 12C-4 are shown in FIG. 6B in the form of side views, each of five protrusions 12C (protrusions 12C-1 to 12C-5) extends in one direction, that is, the top-bottom direction, so as to have a circular-arc-shaped outer circumference. Each protrusion 12C is formed so as to be elliptical in a front view (see the protrusion 12C-3 shown in FIG. 6B) and to become narrower as the position goes toward the outside edge (see FIGS. 6A and 6C). In FIG. 6A which is a plan view, the fusible toy bead 10C assumes a star shape. That is, as shown in FIG. 6A, the fusible toy bead 10C assumes a star shape when projected from at least one direction. A recess 13C (recess 13C-1, 13C-2, 13C-3, 13C-4, or 13C-5) which is long in the one direction, that is, the top-bottom direction, is formed between adjoining ones of the protrusions 12C-1 to 12C-5.

(Modification 4)

Figure 7A:
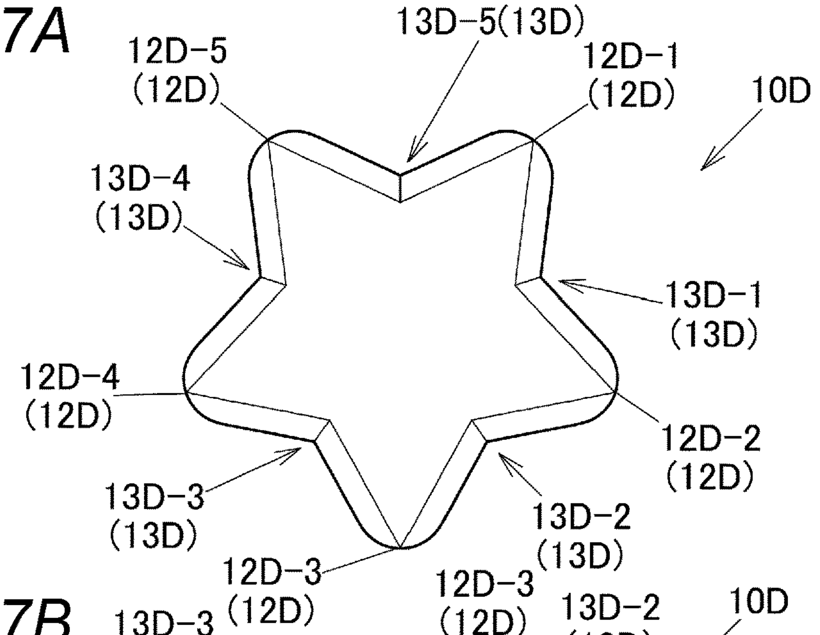
FIGS. 7A-7C are a plan view, a front view, and a perspective view, respectively, of a fusible toy bead according to a fourth modification of the embodiment.
Figure 7B:
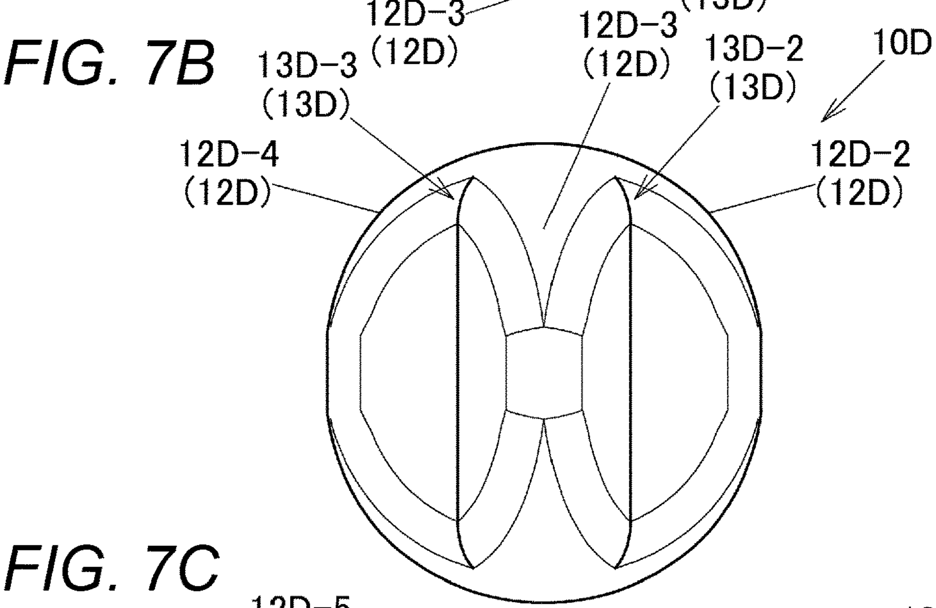
Figure 7C:
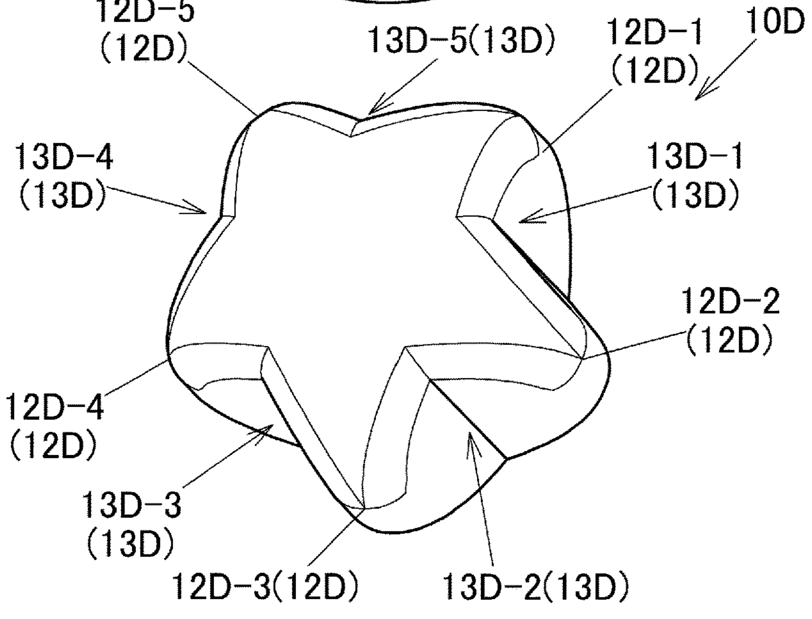

A fusible toy bead 10D shown in FIGS. 7A-7C has plural protrusions 12D and plural recesses 13D. As protrusions 12D-2 and 12D-4 are shown in FIG. 7B in the form of side views, each of five protrusions 12D (protrusions 12D-1 to 12D-5) extends in one direction, that is, the top-bottom direction, so as to have a circular-arc-shaped outer circumference. Each protrusion 12D is formed so as to become narrower as the position goes toward the outside edge (see FIG. 7A) and to be connected to continuous spherical surfaces at its top end and bottom end, respectively as shown in FIGS. 7A and 7C. In FIG. 7A which is a plan view, the fusible toy bead 10C assumes a star shape. That is, as shown in FIG. 7A, the fusible toy bead 10D assumes a star shape when projected from at least one direction. A recess 13D (recess 13D-1, 13D-2, 13D-3, 13D-4, or 13D-5) which is long in the one direction, that is, the top-bottom direction, is formed between adjoining ones of the protrusions 12D-1 to 12D-5.

(Modification 5)

Figure 8A:
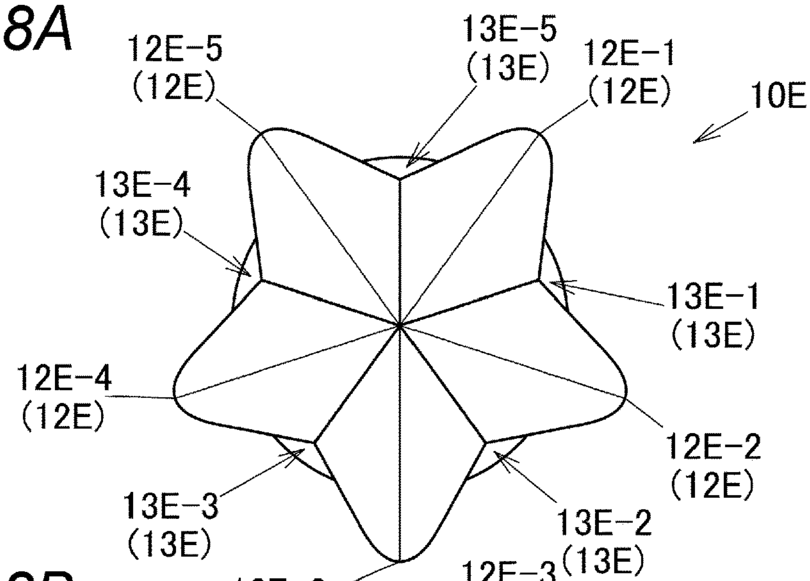
FIGS. 8A-8C are a plan view, a front view, and a perspective view, respectively, of a fusible toy bead according to a fifth modification of the embodiment.
Figure 8B:
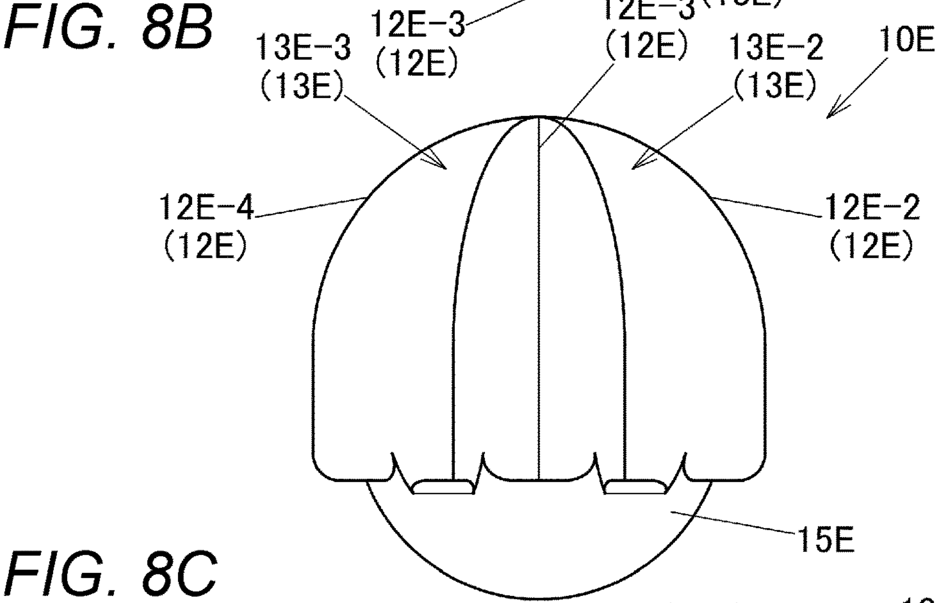
Figure 8C:
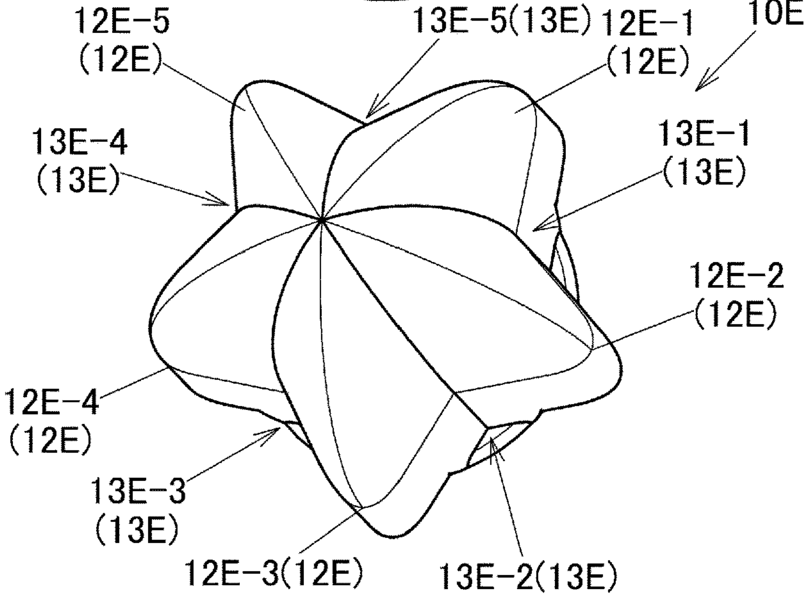

A fusible toy bead 10E shown in FIGS. 8A-8C has plural protrusions 12E and plural recesses 13E. As protrusions 12E-2 and 12E-4 are shown in FIG. 8B in the form of side views, each of five protrusions 12E (protrusions 12E-1 to 12E-5) extends in one direction, that is, the top-bottom direction, so as to have a circular-arc-shaped upper outer circumference and a straight lower outer circumference. Each protrusions 12E is formed so as to become narrower as the position goes toward the outside edge (see FIG. 8A), and is connected to a semispherical portion 15E at its bottom end. As shown in FIG. 8A, the fusible toy bead 10E assumes a star shape when projected from at least one direction. A recess 13E (recess 13E-1, 13E-2, 13E-3, 13E-4, or 13E-5) which is long in the one direction, that is, the top-bottom direction, is formed between adjoining ones of the protrusions 12E-1 to 12E-5.

The above-described embodiment of the invention can provide fusible toy beads that are in the following aspects.

A fusible toy bead according to a first aspect includes a plurality of protrusions and a plurality of recesses.

In the fusible toy bead, another fusible toy bead can be engaged with its protrusion and recess. Thus, the area of contact between fusible toy beads can be made larger than in conventional cases. This makes it possible to provide an assembly of fusible toy beads that is increased in the bonding strength of the fusible toy beads.

An assembly of fusible toy beads is less prone to be damaged. A user can play more pleasantly using an assembly of fusible toy beads by, for example, fitting another decorative member into the assembly or attaching the assembly to a bag, clothes, or the like.

In a fusible toy bead according to a second aspect, a shape projected from at least one direction assumes a star shape.

Since the fusible toy bead having this feature assumes a star shape when viewed from a prescribed direction, an assembly of fusible toy beads can be enhanced in the decoration effect.

In a fusible toy bead according to a third aspect, a plurality of second protrusions adjacent to a first projection of the plurality of protrusions are arranged radially.

In the fusible toy bead having this feature, the protrusions and the recesses can be arranged densely. Thus, the bonding strength of fusible toy beads can be increased.

In a fusible toy bead according to a fourth aspect, at least one of the plurality of protrusions is formed by a plurality of flat surfaces and has one peak.

In the fusible toy bead having this feature, it is possible to have an assembly of fusible toy beads look beautiful by causing diffuse reflection of light at plural surfaces. Furthermore, since two fusible toy beads are engaged with each other in such a manner that the peak of a protrusion of one fusible toy bead goes deep into the bottom of a recess of the other, the bonding strength of fusible toy beads can be increased further.

In a fusible toy bead according to a fifth aspect, the plurality of flat surfaces are four quadrilateral flat surfaces.

In the fusible toy bead having this feature, since one protrusion is formed by four surfaces, a die layout that does not cause an undercut can be realized in the case of manufacturing a fusible toy bead by injection molding.

A fusible toy bead according to a sixth aspect, the number of the plurality of protrusions is 18, and the number of the plurality of flat surfaces is 72.

In the fusible toy bead having this feature, a polyhedral shape having many flat surfaces can be formed in a compact manner. Thus, it becomes possible to have an assembly of fusible toy beads look beautiful through diffuse reflection of light while increasing the contact area.

A fusible toy bead according to a seventh contains a transparent or light-transmitting material.

In the fusible toy bead having this feature, not only light shining on the fusible toy bead directly but also light that goes out after passing through the inside of the fusible toy bead is reflected by flat surfaces of a protrusion or a recess. And light that has passed though and exited from one protrusion is reflected by another protrusion or a recess. These make the fusible toy bead look more brilliant. As a result, it is possible to have the fusible toy bead look more beautiful and to provide a fusible toy bead that is enhanced in the decoration effect.

Although one or more embodiments of the invention have been described above, the invention is not limited to the embodiments and various modifications are possible without departing from the spirit and scope of the invention.

The invention claimed is:

1. A fusible toy bead comprising a plurality of protrusions and a plurality of recesses, wherein each of the plurality of protrusions extends in a protruding direction and having a proximal end and a distal end in the protruding direction, and when viewed from any direction perpendicular to the protruding direction, the distal end has a width smaller than that of the proximal end, wherein each of the recesses is formed by connecting three surfaces opposed to each other such that a dihedral angle on an outer side of the fusible toy bead between each of the three surfaces and adjacent one of the three surfaces is not greater than 180 degrees.

2. The fusible toy bead according to claim 1, wherein the protruding direction is along an axis extending through the fusible toy bead, and the proximal end and distal end of each protrusion are defined with respect to the fusible toy bead.

3. The fusible toy bead according to claim 2, wherein the protruding direction is along an axis extending through the center of the fusible toy bead.

4. The fusible toy bead according to claim 2, wherein each protrusion is formed such that when viewed along the axis of the protruding direction, the adjacent protrusions each have a circular-arc-shaped outer circumference.

5. The fusible toy bead according to claim 4, wherein each protrusion is formed such that when viewed along the axis of the protruding direction, the adjacent protrusions each have a circular-arc-shaped upper outer circumference and a straight lower outer circumference.

6. The fusible toy bead according to claim 4, wherein the fusible toy bead when viewed from at least one direction assumes a star shape.

7. The fusible toy bead according to claim 1, wherein each protrusion is formed such that it becomes narrower from the proximal end to the distal end.

8. The fusible toy bead according to claim 1, wherein a surface of a first protrusion of the plurality of protrusions is connected to a surface of a second protrusion of the plurality of protrusions, the first protrusion being adjacent to the second protrusion.

9. The fusible toy bead according to claim 1, wherein each of the recesses is formed at a center of three protrusions opposed to each other.

10. The fusible toy bead according to claim 1, wherein each of the recesses is formed by connecting surfaces of three protrusions opposed to each other.

11. The fusible toy bead according to claim 1, wherein the plurality of protrusions comprises a first protrusion and a plurality of second protrusions adjacent to and arranged radially around the first protrusion.

12. The fusible toy bead according to claim 1, wherein each of the protrusions is formed by a plurality of surfaces having a same shape.

13. The fusible toy bead according to claim 1, wherein at least one of the plurality of protrusions is formed by a plurality of flat surfaces and has one peak.

14. The fusible toy bead according to claim 13, wherein the plurality of flat surfaces are four quadrilateral flat surfaces.

15. The fusible toy bead according to claim 14, wherein the number of the plurality of protrusions is 18, and the number of the plurality of flat surfaces is 72.

16. The fusible toy bead according to claim 1, wherein the protrusions are formed from a single surface.

17. The fusible toy bead according to claim 1, wherein four or six protrusions are formed radially around each single protrusion.

18. The fusible toy bead according to claim 1, wherein the protrusions are approximately semispherical.

19. A kit of parts comprising at least one fusible toy bead according to claim 1, and a holding tray for use with the at least one fusible toy bead.

* * * * *